J. W. RIFE.
BAIT RETAINING ATTACHMENT FOR FISH HOOKS.
APPLICATION FILED MAR. 30, 1915.
1,150,386.
Patented Aug. 17, 1915.
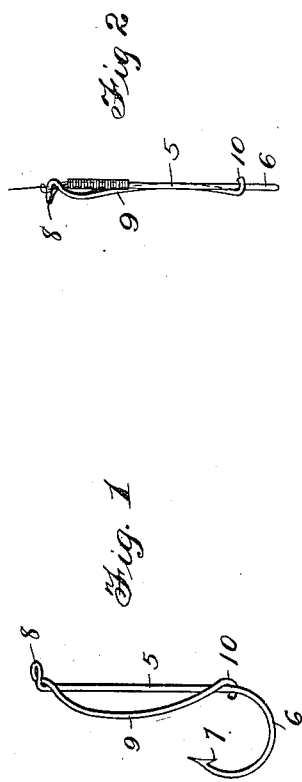
Witnesses
S. Clepatch
J. B. Connolly
Inventor
Jacob W. Rife,
By Shepherd & Campbell
Attorneys

UNITED STATES PATENT OFFICE.

JACOB WILLIAM RIFE, OF SAN DIEGO, CALIFORNIA.

BAIT-RETAINING ATTACHMENT FOR FISH-HOOKS.

1,150,386. Specification of Letters Patent. Patented Aug. 17, 1915.

Application filed March 30, 1915. Serial No. 17,977.

*To all whom it may concern:*

Be it known that I, JACOB WILLIAM RIFE, a citizen of the United States, residing at San Diego, in the county of San Diego and State of California, have invented certain new and useful Improvements in Bait-Retaining Attachments for Fish-Hooks, of which the following is a specification.

This invention relates to fishing hooks and it has for its object the provision of a device made from a single piece of metal and bent to such shape as to comprise the body of the hook proper, an eye to which the usual catgut may be attached and a spring retaining finger normally tending to move toward the rear face of the lower portion of the hook and to engage with the same adjacent the bottom thereof for the purpose of holding soft bait against displacement from the hook when the latter is being used for surf fishing.

This device is likewise useful as a bait retaining device to prevent the too easy dislodgment of the bait from the hook by the fish.

Further objects and advantages of the invention will be set forth in the detailed description which now follows.

In the accompanying drawing:—Figure 1 is a perspective view of a hook and bait retaining device constructed in accordance with the invention, and, Fig. 2 is a rear edge view thereof.

Like numerals designate corresponding parts in both of the figures of the drawing.

Referring to the drawing it will be seen that the entire hook structure is formed of a single piece of material and is bent to comprise a shank 5 the bowed portion 6 and the barb 7 of a hook of usual formation. At the top the shank is bent rearwardly to form an eye 8 and is then bent downwardly and forwardly to form a bowed portion 9 and the terminal hook end 10, which terminal hook end engages the rear side of the hook proper at about the juncture of the shank 5 and the bowed portion 6 of the hook. The entire structure is formed of wire of such temper that the eye 8 constitutes a spring element which normally tends to cause the hook 10 to move forwardly so that when this book is released from the rear side of the hook proper it springs forward out of the way, during the time that the bait is being placed upon said hook proper, after which it is restored to the position illustrated in the drawing and at which time it engages the bait and prevents the accidental dislodgment thereof.

While the elements herein shown and described are well adapted to serve the purposes for which they are intended, it is to be understood that the invention is not limited to the precise construction set forth, but that it includes within its purview whatever is new that comes within the spirit of the appended claims.

Having described my invention, what I claim is:

1. A device of the character described made from a single piece of metal and bent to form a hook proper, comprising a shank and bowed portion, said metal being bent at the top of said shank to form a resilient eye and being bent from said eye to form a downwardly extending element having a hooked terminal end which resiliently engages behind the body of the hook proper.

2. A device of the character described made from a single piece of metal and bent to form a hook proper, comprising a shank and bowed portion, said metal being bent at the top of said shank to form a resilient eye and being bent from said eye to form a downwardly extending element having a hooked terminal end which resiliently engages behind the body of the hook proper at about the juncture of the shank with the bowed portion of the hook.

3. A device of the character described made from a single piece of metal and bent to form a hook proper, comprising a shank and bowed portion, said metal being bent at the top of said shank to form a resilient eye and being bent from said eye to form a downwardly extending, forwardly bowed element having a hooked terminal end which resiliently engages behind the body of the hook proper at about the juncture of the shank with the bowed portion of the hook.

4. A device of the character described made from a single piece of metal and bent to form a hook proper, comprising a shank and bowed portion then bent at the top of said shank to form a right angular resilient eye and being then continued to form a forwardly projecting resilient bowed portion and a terminal hook at the end of said bowed portion, the action of said eye tending to cause said hook to move toward the rear face of the shank and said hook engaging about said shank.

In testimony whereof I affix my signature in presence of two witnesses.

JACOB WILLIAM RIFE.

Witnesses:
J. C. HIZAR,
E. M. MCDONALD.